US008510820B2

(12) United States Patent
Oberheide et al.

(10) Patent No.: US 8,510,820 B2
(45) Date of Patent: Aug. 13, 2013

(54) SYSTEM AND METHOD FOR EMBEDDED AUTHENTICATION

(75) Inventors: Jon Oberheide, Ann Arbor, MI (US); Douglas Song, Ann Arbor, MI (US); Adam Goodman, Bloomfield Hills, MI (US)

(73) Assignee: Duo Security, Inc., Ann Arbor, MI (US)

( * ) Notice: Subject to any disclaimer, the term of this patent is extended or adjusted under 35 U.S.C. 154(b) by 0 days.

(21) Appl. No.: 13/310,532

(22) Filed: Dec. 2, 2011

(65) Prior Publication Data

US 2012/0198535 A1 Aug. 2, 2012

Related U.S. Application Data

(60) Provisional application No. 61/419,198, filed on Dec. 2, 2010.

(51) Int. Cl.

| | |
|---|---|
| ***H04L 29/06*** | (2006.01) |
| *G06F 7/04* | (2006.01) |
| *G06F 15/16* | (2006.01) |
| *G06F 17/30* | (2006.01) |

(52) U.S. Cl.
USPC .................... 726/9; 726/5; 713/155; 709/203

(58) Field of Classification Search
None
See application file for complete search history.

(56) References Cited

U.S. PATENT DOCUMENTS

| | | | | |
|---|---|---|---|---|
| 6,823,359 | B1 * | 11/2004 | Heidingsfeld et al. | 709/203 |
| 6,934,858 | B2 | 8/2005 | Woodhill | |
| 7,574,733 | B2 | 8/2009 | Woodhill | |
| 8,136,148 | B1 * | 3/2012 | Chayanam et al. | 726/5 |
| 8,332,627 | B1 * | 12/2012 | Matthews et al. | 713/155 |
| 2010/0042954 | A1 | 2/2010 | Rosenblatt et al. | |
| 2010/0114740 | A1 * | 5/2010 | Dominguez et al. | 705/27 |
| 2010/0121767 | A1 | 5/2010 | Coulter et al. | |

* cited by examiner

*Primary Examiner* — Shin-Hon Chen
(74) *Attorney, Agent, or Firm* — Jeffrey Schox

(57) ABSTRACT

Various systems and methods of embedded authentication are described herein. One method of the preferred embodiment can include receiving at an authentication server a transaction token from a host website, the host website including an embeddable interface and prompting a user challenge by the authentication server at the embeddable interface. The method of the preferred embodiment can also include creating a signed authentication token in response to a successful user challenge, and transmitting the signed authentication token from the authentication server to the embeddable interface.

18 Claims, 5 Drawing Sheets

SYSTEM AND METHOD FOR EMBEDDED AUTHENTICATION

CLAIM OF PRIORITY

The present application claims priority to U.S. Provisional Patent Application Ser. No. 61/419,198 entitled "Method for Verifying Embeddable Authentication" and filed on 2 Dec. 2010, the entire contents of which are incorporated herein by this reference.

TECHNICAL FIELD

This invention relates generally to the digital user verification field, and more specifically to a new and useful system and method for embedding one or more authentication functions within a website for ensuring user identity.

BACKGROUND AND SUMMARY

As increasingly more sensitive transactions move on-line, securing the transactions and preventing identify theft becomes an increasing concern. Traditional security measures of usernames and passwords are at times not enough to secure a site. Even when websites attempt to secure a website or application, they may not have the know-how or the resources to properly secure the website and the sensitive transaction. Furthermore, computer security is an ever-evolving battle and websites and application developers may not be able to keep up-to date with the latest security measures to provide an adequate account security.

Currently available secondary authentication services fail to address all of these concerns. In order to integrate outside authentication services into various web and remote access products, most services require "backend" integration. In other words, the customer resource (e.g., VPN device) is configured to speak one of its native authentication protocols (e.g., RADIUS, LDAP, AD, etc) to a backend authentication service. Since the customer is usually intending to augment their existing authentication without any frontend customization (e.g., username and passwords validating against a LDAP server), wedging in an additional authentication stage is often difficult. Thus, there is a need in the digital user verification field to create a new and useful method for verifying embeddable authentication.

In solving the aforementioned problems, one method of the preferred embodiment can include initiating an authentication session at a host server; delivering a transaction token from the host server to a host website comprising an embeddable interface; receiving a signed authentication token at the host server from the embeddable interface, wherein the signed authentication token is authenticated by an authentication server in response to a user challenge delivered by the authentication server to the embeddable interface. The first method of the preferred embodiment can also include verifying the signed authentication token at the host server.

A second method of the preferred embodiment can include receiving at an authentication server a transaction token from a host website, the host website including an embeddable interface and prompting a user challenge by the authentication server at the embeddable interface. The second method of the preferred embodiment can also include in response to a successful user challenge, creating a signed authentication token and transmitting the signed authentication token from the authentication server to the embeddable interface.

A third method of the preferred embodiment can include receiving at an authentication server an authentication session initialization request from an embeddable interface and prompting a user challenge by the authentication server at the embeddable interface. The third method of the preferred embodiment can also include in response to a successful user challenge, signing the transaction token by the authentication server to create a signed authentication token; and verifying the signed authentication between the authentication server and a VPN system. Additional features, aspects, and advantages of the methods of the preferred embodiment are described in detail below with reference to the following drawings.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Systems of the Preferred Embodiment

Figure 1:
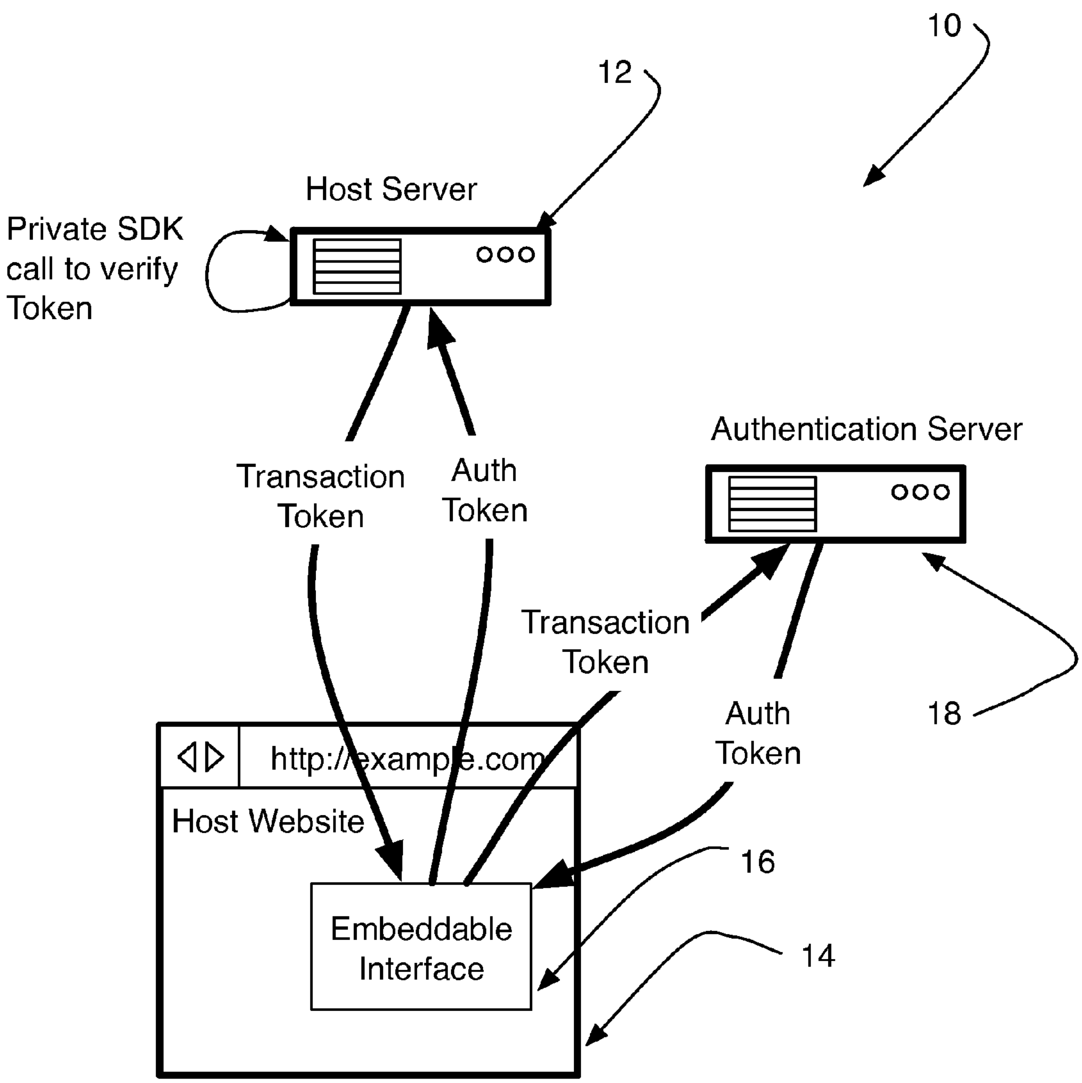
FIG. 1 is a schematic block diagram of a system and/or operating environment of embedded authentication in accordance with one or more example implementations of the present invention.
Figure 2:
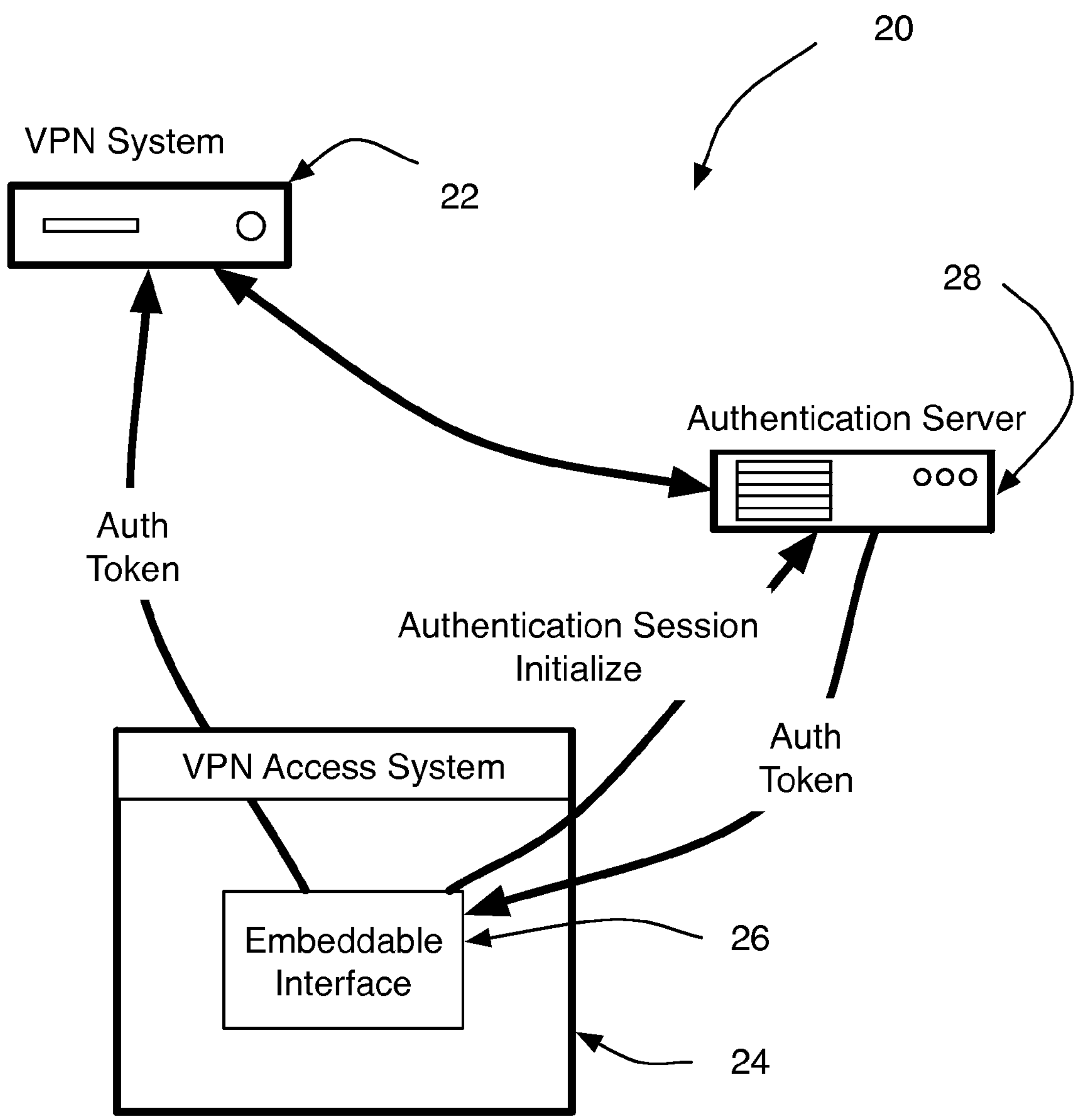
FIG. 2 is a schematic block diagram of a system and/or operating environment of embedded authentication in accordance with one or more example implementations of the present invention.

As shown in FIG. 1, a first system 10 in accordance with a preferred embodiment can include a host server 12, a host website 14 having an embeddable interface 16 disposed therein, and an authentication server 18 in communication with at least the host website 14, the embeddable interface 16, and/or a hosted web-based application. The first system 10 of the preferred embodiment preferably functions to integrate strong second layer authentication into a host's existing resources, i.e., the host website 14. Similarly, as shown in FIG. 2, a second system 20 of the preferred embodiment can include a VPN system 22, a VPN access system 24 having an embeddable interface 26 disposed therein, and an authentication server 28 in communication with at least the VPN system 22 and the embeddable interface 26. The second system 20 of the preferred embodiment preferably functions to integrate a strong second layer into a VPN system 22 and/or VPN remote access device.

As shown in FIG. 1, the host server 12 of the first system 10 of the preferred embodiment can function to interact with a host website 14 and provide one or more services to a user. Preferably, the host server 12 further functions to provide a first layer of security for the user, such as requesting from the user login credentials and the like in order to access the host website 14. As described in further detail below, the host server 12 of the preferred embodiment can further function to request a second layer of authentication through the embeddable interface 16 by initiating an authorization request. In one exemplary embodiment, the host server 12 can be configured to create and transmit a transaction token, which can include for example a signed cookie, and which can be relayed to the authentication server 18 for processing in accordance with the principles set forth below.

As shown in FIG. 1, the embeddable interface 16 of the preferred embodiment can function to modularize and compartmentalize the functionality of the authentication session from any other activities being transacted by the user. In one variation of the first system of the preferred embodiment, the embeddable interface 16 can include a resource displayable on the host website 14 through an IFRAME HTML tag. Alternatively, the embeddable interface 16 can include a resource presentable in Flash, Silverlight, HTML 5, or any other suitable media and/or multimedia player/plug-in. In another alternative, the embeddable interface 16 can include a block element such as a DW, SPAN, or other HTML tag, embedded object, or be embeddable in a host website 14 or application as any suitable modular component.

As shown in FIG. 1, the authentication server 18 of the preferred embodiment can function to interact with the host website 14 and/or the embeddable interface 16 in supplying a second layer of authentication security to the system 10. In operation, the authentication server 18 can be configured to receive a transaction token, such as a signed cookie, and cause a user challenge to be presented to the user in the embeddable interface 16, thereby requiring the user to interact directly with the authentication server 18. The user challenge preferably can include one or more additional requirements and/or requests, including for example any suitable combinations of authentication verifications such as a username/password combination, security key entry, hardware device verification, biometric verification, security questionnaire, and/or outside network verification. The user challenge is preferably facilitated and/or completely contained digitally within the embeddable interface, such that additional devices and/or network connections are not necessary. As an example, the user challenge can include any one or more of responding to a phone call, an SMS message, an MMS message, a fax message, an instant message, a push notification, and/or an email message. Additionally or alternatively, the user challenge can include a secondary network challenge, such as for example providing a one-time password, a security password, answering a security question, contacting an authentication agent by telephone, and/or any other credential that authenticates the user to the system 10.

As shown in FIG. 1, the authentication server 18 of the preferred embodiment can be further configured to create and transmit an authorization token, such as a signed cookie or a signed transaction token, back to the embeddable interface 16. Preferably, the embeddable interface 16 can communicate the authorization token to the host website 14 through inter-frame communications, from which it can be directed (using JavaScript for example) to the host server 12 for verification. In variations of the preferred embodiments described below, the authorization token can be encrypted or otherwise concealed from potential attackers to maintain propriety of the authentication service. The host server 12 of the preferred embodiment can be configured to verify the authentication token through a remote API call or a local SDK call or any other suitable means. Upon successful authentication through the user challenge, the host server 12 can be configured to set any application-level state necessary to mark the user as successfully logged in.

As shown in FIG. 1, the host server 12 of the preferred embodiment and the authentication server 18 of the preferred embodiment can perform the various transaction and/or authentication functions specified above. As an example, the system 10 of the preferred embodiment can use symmetric or asymmetric keys that are shared between the host server 12 and the authentication server 18. Preferably, a key is signed by a transmitting server and verified by a receiving server. For example, the transaction token can function as a notification from the host server 12 to the authentication server 18 that the user has completed a primary authentication and should be challenged for secondary authentication as described herein. Likewise, the authentication token can function as a notification from the authentication server 18 to the host server 12 that the user has completed the secondary authentication via the user challenge in the embeddable interface 16. As noted above, the host server 12 and/or the authentication server 18 can use any combination of symmetric or asymmetric keys in generating the respective tokens, or any other suitable key and/or token system usable in identifying and/or authenticating a user to a system.

As shown in FIG. 2, a second system 20 of the preferred embodiment is configured for operation with a VPN remote access environment, which can include for example a VPN system 22 and a VPN access system 24 configurable as a browser-enabled entry point for users. Preferably, the VPN access system 24 can be configured for displaying an embeddable interface 26 through which the VPN system 22 can cause an authentication session initiation with the authentication server 28. The authentication session initiation can include for example a request to the authentication server 28 to direct one or more user challenges of the type described above to the embeddable interface 26. In response to a successful user challenge, as described above, the authentication server 28 can be configured to create a signed authorization token representing a successful authorization of the user.

As shown in FIG. 2, the embeddable interface 26 of the preferred embodiment can be configured to direct the signed authorization token to the VPN system 22 via an inter-frame communication with the VPN access system 24 of the type described above with reference to FIG. 1. In one alternative of the system 20 of the preferred embodiment, the VPN system 22 can be configured without any local protocols for verifying the signed authentication token as described with reference to FIG. 1 above. In such an event, as shown in FIG. 2, the VPN system 22 can be configured to communicate directly with the authentication server 28 through a VPN supported protocol such as Lightweight Directory Access Protocol (LDAP) or Remote Authentication Dial In User Service (RADIUS), or any other suitable VPN-supported protocol. In such a manner, the authentication server 28 can preferably validate its own signed authentication token and confirm that validation with the VPN system 22 so that the authenticated user will be permitted to log into the network. Additional features and advantages of the first and second systems 10, 20 of the preferred embodiment are described below with reference to FIGS. 3, 4 and 5 and the methods of the preferred embodiment.

2. Methods of the Preferred Embodiment

Figure 3:
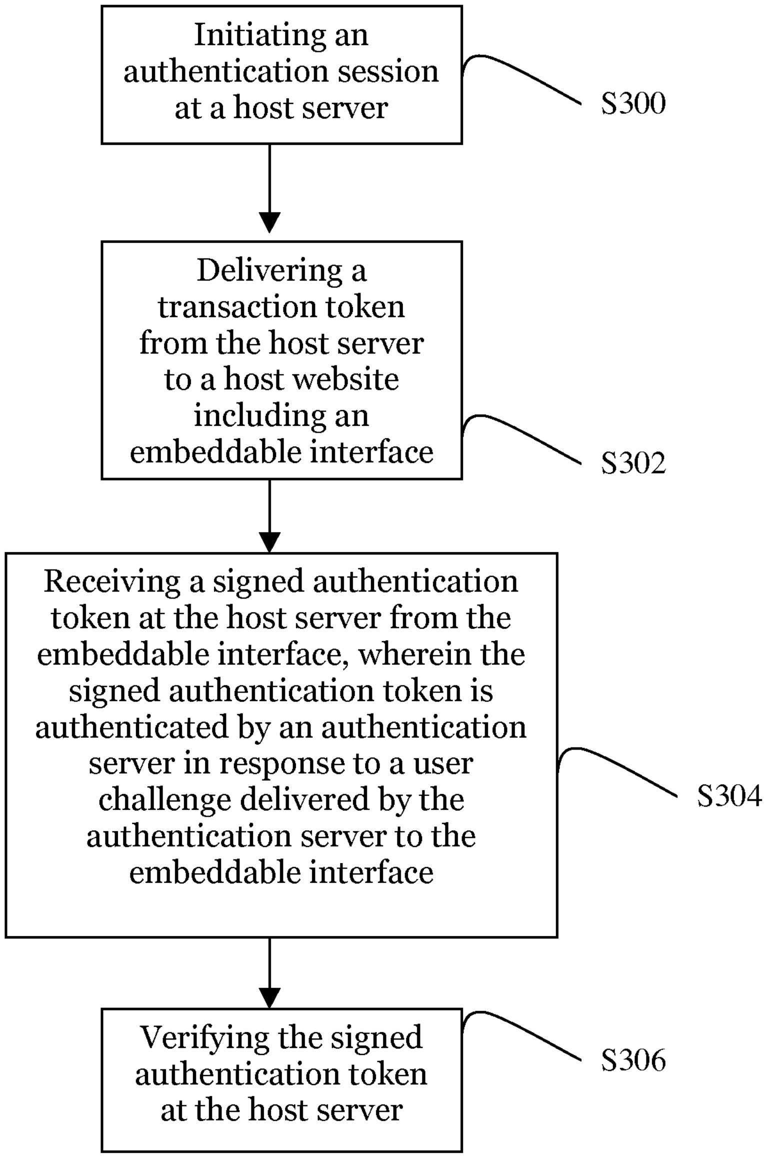
FIG. 3 is a flowchart depicting a method of embedded authentication according to a first preferred embodiment of the present invention.

As shown in FIG. 3, a first method of the preferred embodiment can include initiating an authentication session at a host server at block S300 and delivering a transaction token from the host server to a host website including an embeddable interface at block S302. The first method of the preferred embodiment can further include receiving a signed authentication token at the host server from the embeddable interface at block S304. Preferably, the signed authentication token is authenticated by an authentication server in response to a user challenge delivered by the authentication server to the embeddable interface. The first method of the preferred embodiment can also include verifying the signed authentication token at the host server at block S306. The first method of the preferred embodiment functions to provide a second layer of user authentication through an embeddable interface, thus creating efficiencies for parties implementing authentication security protocol.

As shown in FIG. 3, the first method of the preferred embodiment includes block S300, which recites initiating an authentication session at a host server. Block S300 preferably functions to start, initiate, begin, continue, create and/or generate an authentication session with an embeddable interface accessible through a remote computer, such as for example a user's desktop computer, laptop computer, PDA, smartphone, tablet computer, or the like. Preferably, the embeddable interface can be disposable within a browser window or application running on the remote computer. In one variation of the first method of the preferred embodiment, initiating the authentication session can include generating a local SDK call or a remote API call at the host server. In another variation of the first method of the preferred embodiment, initiating the authentication session can include generating and/or creating a transaction token. Preferably, the SDK call or the API call can create the transaction token, which can include a signed cookie usable by an authentication server of the type described below. Alternatively, the transaction token can include any shared key or device configured to validate the authentication session.

In another variation of the first method of the preferred embodiment, initializing the authentication session at the host server can include prompting a user to provide user credentials. The user credentials can function as a first layer of authentication security in confirming the identity of the user. As an example, the user credentials can include a username and password, which together function as two pieces of information required to create the first layer of authentication. Alternatively, the user credentials can include device-based credentials, such as physical addresses and or characteristics of a device including an IP address, stored cookie, IMEI address, MAC address, Wi-Fi address, device serial number, Bluetooth address, ICCID address, or any suitable combination or sub-combination thereof.

As shown in FIG. 3, the first method of the preferred embodiment can also include block S302, which recites delivering a transaction token from the host server to a host website, wherein the host website can include the embeddable interface. The embeddable interface of the first method of the preferred embodiment functions to modularize and compartmentalize the functionality of the authentication session from any other activities being transacted by the user. In one variation of the first method of the preferred embodiment, the embeddable interface can include a resource displayable through an IFRAME HTML tag. Alternatively, the embeddable interface can include a resource presentable in Flash, Silverlight, HTML 5, or any other suitable media and/or multimedia player/plug-in. In another alternative, the embeddable interface can include a block element such as a DW, SPAN, or other HTML tag, embedded object, or be embeddable in a webpage or application as any suitable modular component. Preferably, the transaction token is passed directly through the embeddable interface for subsequent communication to an authentication server as described in greater detail below. Alternatively, the transaction token can be operated on at and/or by the embeddable interface (in response to user input) prior to or concurrent with transmission to the authentication server.

As shown in FIG. 3, the first method of the preferred embodiment can include block S304, which recites receiving a signed authentication token at the host server from the embeddable interface. Preferably, the signed authentication token is authenticated by the authentication server in response to a user challenge delivered by the authentication server to the embeddable interface. Block S304 functions to authenticate the transaction token and to provide a second layer of authentication security through the user challenge. Preferably, the authentication server further functions to verify the authenticity of the transaction token and/or the authenticity of the signed cookie serving as the transaction token. The authentication token of the first method of the preferred embodiment can include a signed cookie generated by the authentication server, or alternatively any other suitable shared key or device to indicate to the host server that the authentication server is performing the authentication.

Preferably, the user challenge recited in block S304 of the first method of the preferred embodiment can include a secondary message transmittable to the embeddable interface. A preferable secondary message can include any suitable combination of authentication verifications such as a username/password combination, security key entry, hardware device verification, biometric verification, security questionnaire, and/or outside network verification. The user challenge is preferably facilitated and/or completely contained digitally within the embeddable interface, such that additional devices and/or network connections are not necessary. As an example, the user challenge can include any one or more of responding to a phone call, an SMS message, an MMS message, a fax message, an instant message, a push notification and/or an email message. Additionally or alternatively, the user challenge can include a secondary network challenge, such as for example providing a one-time password, a security password, answering a security question, contacting an authentication agent by telephone, and/or any other credential that authenticates the user to the system.

As shown in FIG. 3, the first method of the preferred embodiment can also include block S306, which recites verifying the signed authentication token at the host server. Block S306 functions to ensure that the authentication token indicates a successful completion of the user challenge, i.e., verifying the authenticity of the user. Alternatively, block S306 can additionally function to determine an unsuccessful completion of the user challenge, i.e., indicating either a fraudulent authentication attempt or a user error. Preferably, verifying the signed authentication token can include the host ending the authentication session by calling an end-session method. As an example, the host can terminate the authentication session by calling a local SDK or a remote API that is configured to verify the signed authentication token received by the host server in block S304. Additionally or alternatively, in response to a successful authentication, the host server can set a selected or predetermined application-level state necessary or desirable for a successful authentication.

Figure 4:
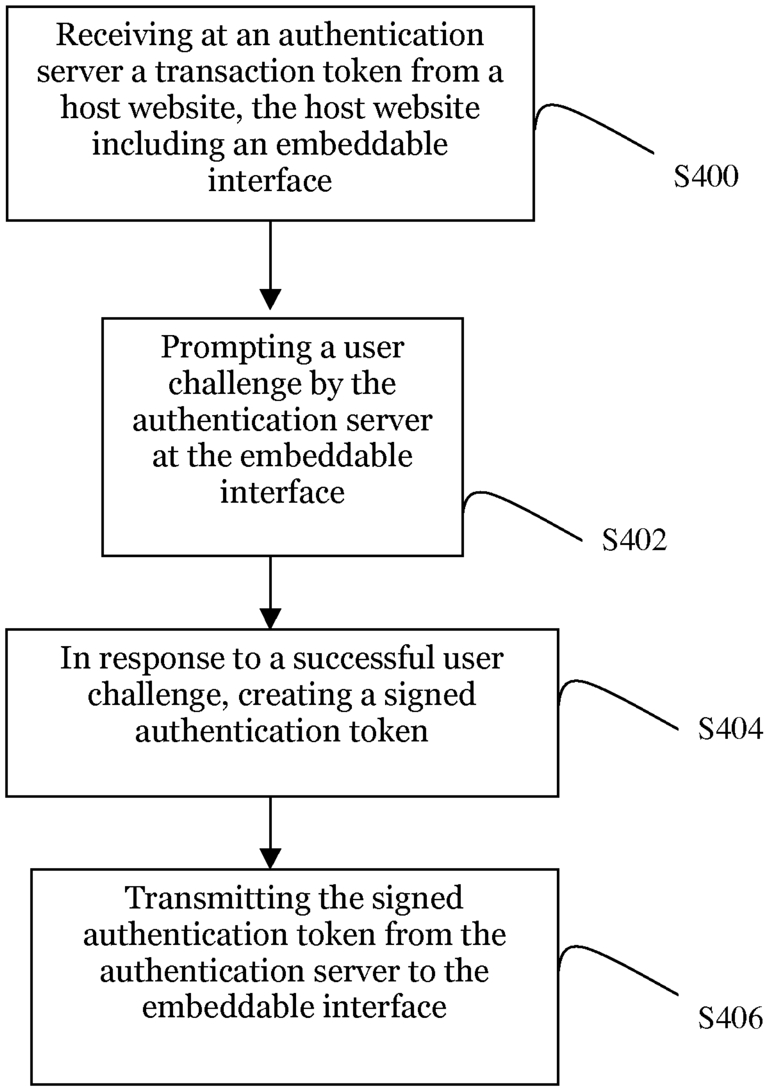
FIG. 4 is a flowchart depicting a method of embedded authentication according to a second preferred embodiment of the present invention.

As shown in FIG. 4, block S400 of a second method of the preferred embodiment can include receiving at an authentication server a transaction token from a host website, wherein the host website can include an embeddable interface. The second method of the preferred embodiment can further include prompting a user challenge by the authentication server at the embeddable interface in block S402, and in response to a successful user challenge, creating a signed authentication token in block S404. The second method of the preferred embodiment can further include transmitting the signed authentication token from the authentication server to the embeddable interface in block S406. The second method of the preferred embodiment functions to provide supplementary and/or second layer authentication services to a host through an embeddable interface using one or more user challenges.

As shown in FIG. 4, the second method of the preferred embodiment can include block S400, which recites receiving at an authentication server a transaction token from a host website, wherein the host website preferably includes an embeddable interface. Block S400 functions to enable an authentication server to provide second layer authentication services relating to the user. Preferably, the authentication server can be a trusted stand-alone server separate from the host server and/or the host website. Preferably, the transaction token is generated by a host server, and can include for example a signed cookie generated and/or created at the host server. Alternatively, the transaction token can include any shared key or device configured to validate the authentication session.

As noted above, the embeddable interface preferably functions to modularize and compartmentalize the functionality of the authentication session from any other activities being transacted by the user. In one variation of the first method of the preferred embodiment, the embeddable interface can include a resource displayable through an IFRAME HTML tag. Alternatively, the embeddable interface can include a resource presentable in Flash, Silverlight, HTML 5, or any other suitable media and/or multimedia player/plug-in. In another alternative, the embeddable interface can include a block element such as a DW, SPAN, or other HTML tag, embedded object, or be embeddable in a webpage or application as any suitable modular component. Preferably, the transaction token is passed directly through the embeddable interface for subsequent communication to the authentication server as shown in block S400. Alternatively, the transaction token can be operated on at and/or by the embeddable interface (in response to user input) prior to or concurrent with transmission to the authentication server.

As shown in FIG. 4, the second method of the preferred embodiment can further include block S402, which recites prompting a user challenge by the authentication server at the embeddable interface. Block S402 preferably functions to display, render, transmit, communicate, and/or deliver the user challenge to the user through the embeddable interface. In one variation of the second method of the preferred embodiment, the user challenge can include a secondary message transmittable to the embeddable interface. Preferably, the secondary message can include any suitable combination of authentication verifications such as a username/password combination, security key entry, hardware device verification, biometric verification, security questionnaire, user-specific identifier or credential, and/or outside network verification.

In another variation of the second method of the preferred embodiment, the user challenge is preferably facilitated and/or completely contained digitally within the embeddable interface, such that additional devices and/or network connections are not necessary. Preferably, the user challenge can include any one or more of responding to a phone call, an SMS message, an MMS message, a fax message, an instant message, a push notification, and/or an email message. Additionally or alternatively, the user challenge can include a one-time password, a secondary network challenge, such as for example providing a security password, answering a security question, contacting an authentication agent by telephone, and/or any other credential that authenticates the user to the system.

As shown in FIG. 4, the second method of the preferred embodiment can include block S404, which recites creating a signed authentication token in response to a successful user challenge. Block S404 preferably functions to authenticate the transaction token and to provide a second layer of authentication security through the user challenge. Preferably, the authentication server further functions to verify the authenticity of the transaction token and/or the authenticity of the signed cookie serving as the transaction token. The authentication token of the second method of the preferred embodiment can include a signed cookie generated by the authentication server, signing the transaction token provided by the host server (which itself can be a signed cookie, as noted above), or alternatively any other suitable shared key or device to indicate to the host server that the authentication server is performing the authentication.

As shown in FIG. 4, the second method of the preferred embodiment can include block S406, which recites transmitting the signed authentication token from the authentication server to the embeddable interface. Block S406 preferably functions to deliver confirmation of the user authenticity to the host through the embeddable interface. In another variation of the second method of the preferred embodiment, the embeddable interface is disposed within the same browser/application as the host website, thereby permitting the embeddable interface to pass the signed authentication token through to the containing host website frame through inter-frame communication. Preferably, the host website can use JavaScript or any other suitable method to submit or POST the signed authentication token to the host server. As noted above, upon receiving the signed authentication token, the host server preferably verifies its authenticity to ensure that is was derived from a trusted authentication server and that the user successfully completed the user challenge.

Another variation of the second method of the preferred embodiment can include transmitting an alternative message to the embeddable interface for delivery to the host server in response to an unsuccessful user challenge. Preferably, the authentication server responds to an unsuccessful user challenge by either suggesting remedial action to the user or restricting access by the user either temporarily or permanently. As an example, the authentication server can transmit another (identical or distinct) user challenge to the embeddable interface to give the user another chance to pass the user challenge. Alternatively, the authentication server can transmit a message to the user indicating termination of the authentication session for a period of time. In yet another alternative, the authentication server can block the IP address of the embeddable interface for a predetermined interval in response to an unsuccessful user challenge. Additionally or alternatively, the authentication server can return an authentication token (signed or unsigned) for transmission to the host server with the intention of indicating unsuccessful and/or suspicious authentication behavior or any other suitable message. Upon failed verification of the authentication token at the host server, the host server can preferably determine that the user/attacker cannot be authenticated, and therefore take its own action against the user/attacker.

Figure 5:
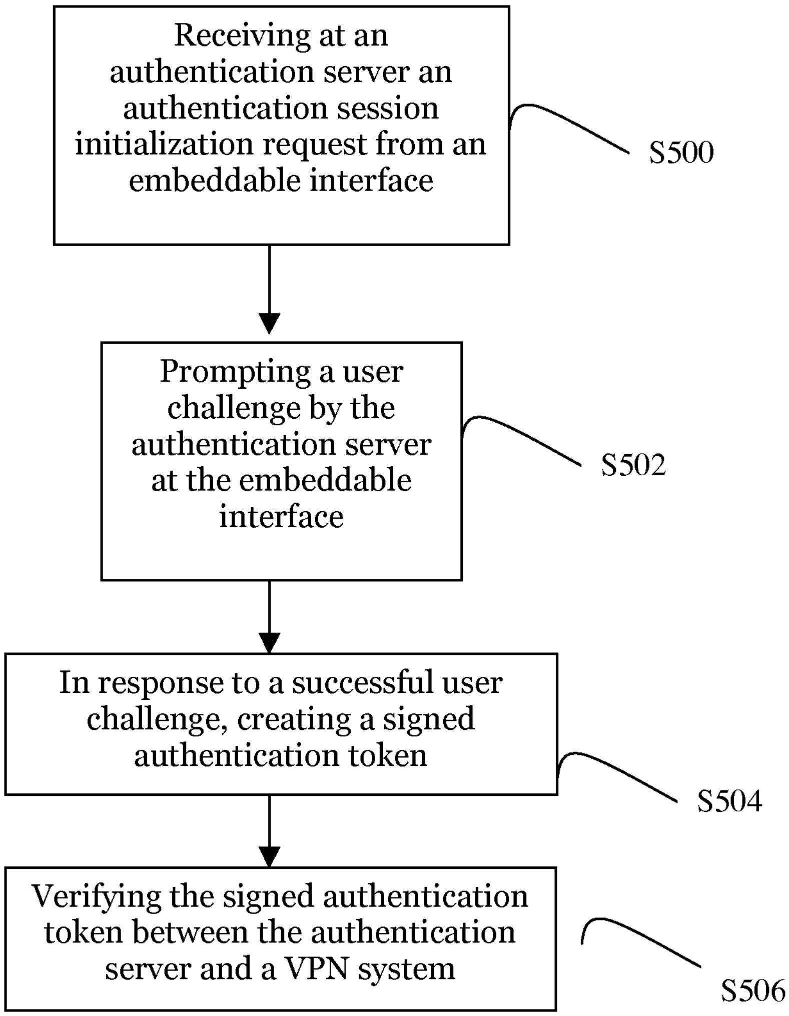
FIG. 5 is a flowchart depicting a method of embedded authentication according to a third preferred embodiment of the present invention.

As shown in FIG. 5, a third method of the preferred embodiment can include receiving at an authentication server an authentication session initialization requires from an embeddable interface at block S500 and prompting a user challenge by the authentication server at the embeddable interface in block S502. The third method of the preferred embodiment can also include creating a signed authentication token in response to a successful user challenge in block S504 and verifying the signed authentication token between the authentication server and a VPN system in block S506. The third method of the preferred embodiment preferably functions to provide second layer authentication services through an embeddable interface disposed within a host wherein the server side code cannot be modified, such as for example a VPN remote access system. In an example VPN system, the user can be required to successfully login to the VPN system using his or her login credentials, in response to which the preferred authentication session through the embeddable interface can proceed.

As shown in FIG. 5, the third method of the preferred embodiment can include block S500, which recites receiving at an authentication server an authentication session initialization request from an embeddable interface. Block S500 preferably functions to enable an authentication server to provide second layer authentication services relating to the user. Preferably, the authentication server can be a trusted stand-alone server separate from the VPN system to which access is sought. Preferably, the authentication session initialization request is generated by a VPN access system in response to a user's sufficient first layer identification, such as providing the correct login credentials to the VPN access system. In one variation of the third method of the preferred embodiment, the authentication session initialization request can include a message, transmission, token, cookie, or any other suitable notification. Alternatively, the authentication session initialization request can include any shared key or device configured to validate the authentication session.

The embeddable interface of the third method of the preferred embodiment can be disposed in or with a browser window for accessing the VPN access system. As noted above, the embeddable interface preferably functions to modularize and compartmentalize the functionality of the authentication session from any other activities being transacted by the user. In one variation of the first method of the preferred embodiment, the embeddable interface can include a resource displayable through an IFRAME HTML tag. Alternatively, the embeddable interface can include a resource presentable in Flash, Silverlight, HTML 5, or any other suitable media and/or multimedia player/plug-in. In another alternative noted above, the embeddable interface can include a block element such as a DIV, SPAN, or other HTML tag, embedded object, or be embeddable in a webpage or application as any suitable modular component. Preferably, embeddable interface is transparent to the authentication session initialization request and authentication token and merely passes these elements between the authentication server and the VPN system.

As shown in FIG. 5, the third method of the preferred embodiment can include block S502, which recites prompting a user challenge by the authentication server at the embeddable interface. Block S502 preferably functions to display, render, transmit, communicate, and/or deliver the user challenge to the user through the embeddable interface. In one variation of the third method of the preferred embodiment, the user challenge can include a secondary message transmittable to the embeddable interface. As noted above, a preferable secondary message can include any suitable combination of authentication verifications such as a username/password combination, security key entry, hardware device verification, biometric verification, security questionnaire, user-specific identifier or credential, and/or outside network verification.

In another variation of the third method of the preferred embodiment, the user challenge is preferably facilitated and/or completely contained digitally within the embeddable interface, such that additional devices and/or network connections are not necessary. As noted above, a preferable user challenge can include any one or more of responding to a phone call, an SMS message, an MMS message, a fax message, an instant message, and/or an email message. Additionally or alternatively, a preferred user challenge can include a secondary network challenge, such as for example providing a security password, answering a security question, and/or contacting an authentication agent by telephone.

As shown in FIG. 5, the third method of the preferred embodiment can include block S504, which recites creating a signed authentication token in response to a successful user challenge. Block 504 preferably functions to authenticate the authentication session initialization request (which can include for example a token transmitted by the VPN access system) and to provide a second layer of authentication security through the user challenge. Preferably, the authentication server further functions to verify the authenticity of the authentication session initialization request and/or the authenticity of the element (e.g., a signed cookie) serving as the transaction token for the VPN system. The signed authentication token of the third method of the preferred embodiment can include a signed cookie generated by the authentication server, signing any transaction token provided by the VPN system (which itself can be a signed cookie, as noted above), or alternatively any other suitable shared key or device to indicate to the host server that the authentication server is performing the authentication.

As shown in FIG. 5, the third method of the preferred embodiment can also include block S506, which recites verifying the signed authentication token between the authentication server and a VPN system. Block S406 preferably functions to deliver confirmation of the user authenticity to the VPN system through the embeddable interface. In one variation of the third method of the preferred embodiment, verifying the signed authentication token between the authentication server and the VPN system can include returning the signed authentication token from the VPN system to the authentication server such that the authentication server can perform verification. As an example, a VPN protocol such as LDAP or RADIUS can be utilized to relay the signed authentication token directly between the VPN system and the authentication server without use of the embeddable interface. Preferably, the authentication server can verify its own signed authentication token and communicate the results back to the VPN system directly using one of the aforementioned protocols.

Another variation of the third method of the preferred embodiment can include transmitting an alternative message from the authentication server to the VPN system in response to an unsuccessful user challenge. Preferably, the authentication server responds to an unsuccessful user challenge by either suggesting remedial action to the user or restricting access by the user either temporarily or permanently. As noted above, the authentication server can optionally transmit another (identical or distinct) user challenge to the embeddable interface to give the user another chance to pass the user challenge. Alternatively, the authentication server can transmit a message to the user indicating termination of the authentication session for a period of time. In yet another alternative noted above, the authentication server can block the IP address of the embeddable interface for a predetermined interval in response to a unsuccessful user challenge. Additionally or alternatively, the authentication server can directly communicate the unsuccessful and/or suspicious authentication behavior or any other suitable message to the VPN system. Upon notification of the failed authentication at the VPN system, the VPN system can preferably determine that the user/attacker cannot be authenticated, and therefore take its own action against the user/attacker.

The systems and methods of the preferred embodiment can be embodied and/or implemented at least in part as a machine including at least in part a computer-readable medium storing computer-readable instructions. The instructions are preferably executed by computer-executable components preferably integrated with the host website 14 and/or embeddable interface 16, the host server 12, the VPN system 22, the VPN access system 24, and/or the authentication server 18, 28. The computer-readable medium can be stored on any suitable computer readable media such as RAMs, ROMs, flash memory, EEPROMs, optical devices (CD or DVD), hard drives, floppy drives, or any suitable device. The computer-executable component is preferably a processor but any suitable dedicated hardware device can (alternatively or additionally) execute the instructions.

As a person skilled in the art will recognize from the previous detailed description and from the figures and claims, modifications and changes can be made to the preferred embodiments of the invention without departing from the scope of this invention defined in the following claims.

What is claimed is:

1. A method comprising:
- initiating an authentication session at a host server that comprises prompting a host website for credentials of a first layer of authentication with the host server and generating a transaction token;
- delivering the transaction token from the host server to a host website comprising an embeddable interface;
- receiving a signed authentication token at the host server from the embeddable interface, wherein the signed authentication token is authenticated in a second layer of authentication by an authentication server in response to a user challenge delivered by the authentication server to the embeddable interface and in response to authentication of the transaction token;
- verifying the signed authentication token at the host server; and
- if the authentication token is successfully verified, setting an application-level state of a successful authentication.

2. The method of claim 1, wherein the embeddable interface comprises an iframe within a webpage.

3. The method of claim 1, wherein the credentials comprises a user name and password.

4. The method of claim 1, wherein the transaction token comprises a signed cookie.

5. The method of claim 1, wherein the user challenge comprises a secondary message transmitted to the embeddable interface.

6. A method comprising:
- receiving at an authentication server a transaction token from a host website, the host website comprising an embeddable interface;
- at the authentication server, authenticating the transaction token to be a transaction token from a host that indicates a successful first layer of authentication at the host server;
- prompting a user challenge of a second layer of authentication by the authentication server at the embeddable interface;
- in response to a successful user challenge and an authentic transaction token, creating a signed authentication token; and
- transmitting the signed authentication token from the authentication server to the embeddable interface.

7. The method of claim 6, wherein the embeddable interface comprises an iframe within a webpage.

8. The method of claim 6, wherein the transaction token comprises a signed cookie.

9. The method of claim 6, wherein the user challenge comprises a secondary message transmitted to the embeddable interface.

10. The method of claim 9, wherein the user challenge comprises one of a voice call, an SMS message, an MMS message, a fax message, an instant message, an email, a security question, a push notification, a one-time password, or identification of an authentication agent.

11. The method of claim 6, wherein the signed authentication token comprises a signed cookie.

12. The method of claim 6, further comprising in response to an unsuccessful user challenge, transmitting an alternative message to the embeddable interface for delivery to a host server.

13. A method comprising:
- receiving at an authentication server an authentication session initialization request from an embeddable interface, wherein the authentication session initialization request is generated by a virtual private network (VPN) access system in response to a successful first layer of identification;
- authenticating the authentication session initialization request at the authentication server;
- prompting a user challenge of a second layer of authentication by the authentication server at the embeddable interface;
- in response to a successful user challenge, creating a signed authentication token; and
- verifying the signed authentication token between the authentication server and a VPN system.

14. The method of claim 13, wherein the embeddable interface comprises an iframe within a webpage.

15. The method of claim 13, wherein the user challenge comprises a secondary message transmitted to the embeddable interface.

16. The method of claim 15, wherein the user challenge comprises one of a voice call, an SMS message, an MMS message, a fax message, an instant message, an email, a security question, a push notification, a one-time password, or identification of an authentication agent.

17. The method of claim 13, wherein verifying the signed authentication token between the authentication server and the VPN system comprises returning the signed authentication token from the VPN system to the authentication server such that the authentication server can perform verification.

18. The method of claim 13, further comprising in response to an unsuccessful user challenge, transmitting an alternative message to the embeddable interface to delivery to the VPN system.

* * * * *